May 19, 1936. V. L. JOHANNESSEN 2,041,067
TESTING APPARATUS
Filed Jan. 10, 1935
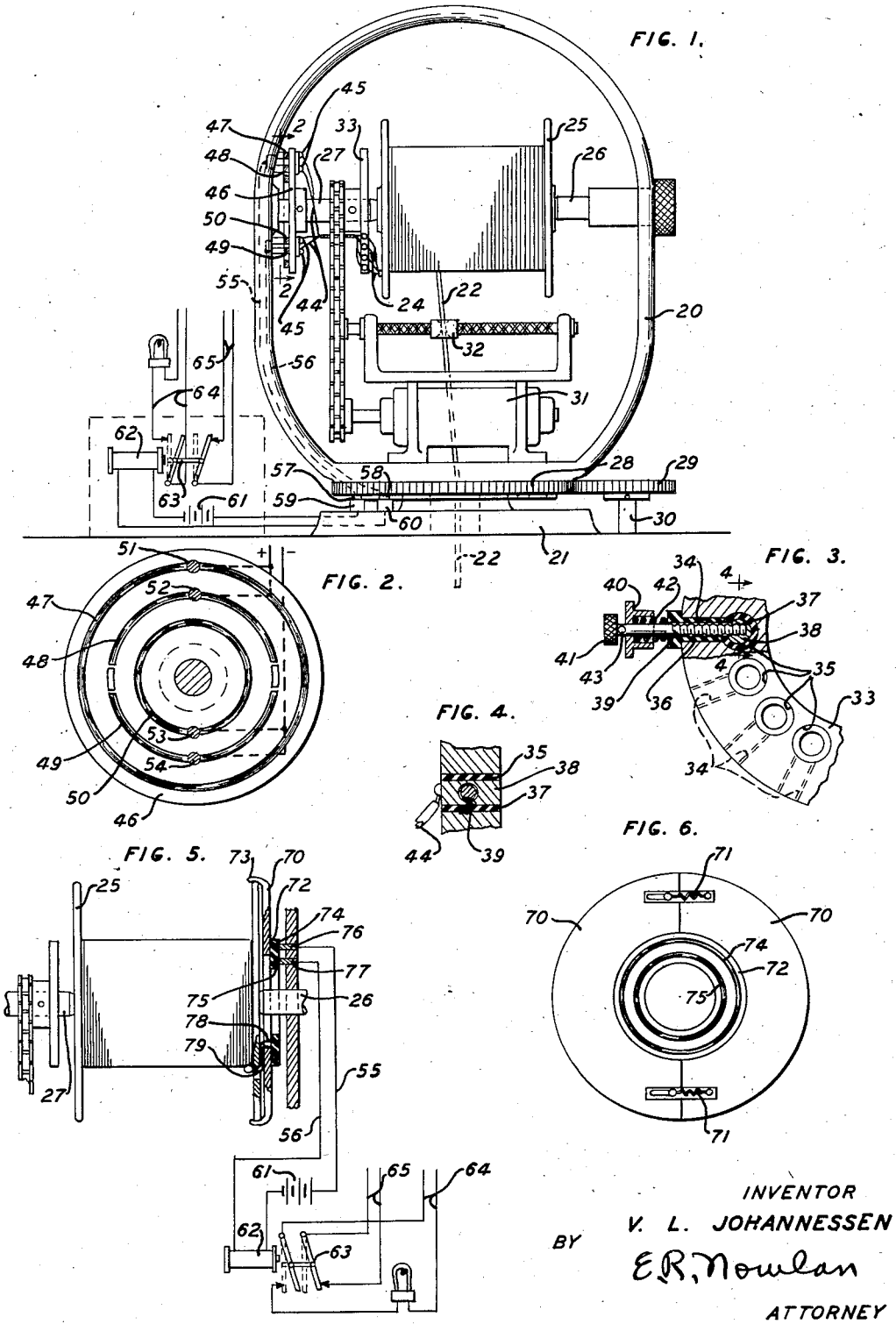
INVENTOR
V. L. JOHANNESSEN
BY
E.R. Nowlan
ATTORNEY Patented May 19, 1936

2,041,067

UNITED STATES PATENT OFFICE 2,041,067

TESTING APPARATUS

Vaughn L. Johannessen, Cranford, N. J., assignor to Western Electric Company, Incorporated, New York, N. Y., a corporation of New York Application January 10, 1935, Serial No. 1,133

4 Claims. (Cl. 175—183)

This invention relates to testing apparatus, and more particularly to an apparatus for testing multi-conductor cables, during manufacture, for short circuits between the several conductors therein.

In the manufacture of some types of multi-conductor cables for various electrical uses, individual insulated conductor strands are intertwisted in various ways and subsequently may be sheathed with insulating and/or protective material. During the intertwisting of the conductors, accidental abrasion of the insulation on them may produce short circuits and it is of importance to detect and eliminate these as soon as may be.

It is one object of the present invention to provide a device or means in apparatus for intertwisting or otherwise combining conductor strands which will detect and signal the occurrence of short circuits between the strands.

One embodiment of the invention contemplates a take-up device for multi-conductor cables having the usual means to mount and drive a removable take-up reel, spool or the like, together with a rotatable disc associated with the reel or the reel support to rotate therewith, having insulated slip ring segments mounted thereon connectible to the various conductors of the cable being wound on the reel. Stationary brushes are mounted to bear against the slip ring segments and are connected to a source of electric current and to a signal device such as a lamp, bell or the like. They may also be connected in a circuit controlling the drive of the apparatus to stop the machine as well as to signal. The segments are so proportioned and arranged that the testing potential is applied at least once during each revolution of the disc to each possible pair of conductors.

The above and other objects and features of the invention will appear from the following detailed description of embodiments thereof taken in connection with the accompanying drawing in which the same reference numerals are applied to identical parts in the several figures and in which Fig. 1 is a diagrammatic plan view of a take-up device for winding cable on a reel, provided with means constructed in accordance with the invention to detect and signal short circuits between conductors of the cable and to stop the drive of the reel;

Fig. 2 is an enlarged view on the line 2—2 of Fig. 1;

Fig. 3 is an enlarged broken view of a portion of the connector disc;

Fig. 4 is a section on the line 4—4 of Fig. 3;

Fig. 5 is a view similar to Fig. 1 of another embodiment, and

Fig. 6 is a detached side view of the contact disc of Fig. 5.

In the embodiment disclosed in Figs. 1 to 4 inclusive, a yoke 20 is rotatably mounted on the frame 21 of a strand assembling machine such as a twister, strander, cabling machine or the like, whose precise nature is irrelevant to the present invention beyond the fact that it delivers a compound strand 22 comprising in the present instance four associated insulating conductor strands 24, to be taken-up or wound on a take-up reel 25 removably mounted in the yoke 20 on spindles 26 and 27. The yoke 20 may be revolved carrying the reel with it to aid in intertwisting the strands 24, by means of gears 28 and 29 from a power shaft 30. The spindle 27 and therewith the reel 25 are driven in rotation to wind the cable 22 on the reel by the motor 31 through a chain and sprocket drive which also drives means 32 to distribute the cable on the reel.

A connector disc 33 of metal is mounted on the spindle 27 to rotate therewith, and is formed with four radial bores 34 in its periphery and with a transverse bore 35 intersecting the bottom of each radial bore. An insulating sleeve 36 is positioned in each bore 34 and an insulating sleeve 37 is positioned in each bore 35 and is laterally perforated in alignment with the bore of the corresponding sleeve 35. A tightly fitting metal plug 38 is located in each sleeve 37 and has a tapped hole in alignment with the bore of the corresponding sleeve 35 to receive the threaded end of a screw 39 housed in the sleeve 35. A metal collar 40 is slidably located on the outer shank of the screw and is pressed toward the head 41 of the screw by a compression spring 42. The shank of each screw 39 is formed just below its head with a transverse perforation 43 to receive the ends of the several conductors 24 brought out through a perforation in the adjacent head of the reel 25. The conductor ends are removably clamped in the perforations 43 by the springs 42 and collars 40.

A conductor 44 is secured as by soldering to the left hand end of each plug 38 and these four conductors are brought together and through an aperture in the drive sprocket on the spindle 27 and connected respectively to four screws or bolts or the like 45 spacedly located along a diameter of the right hand face of a distributor disc 46 mounted as shown on the spindle 27 to rotate therewith. Each of the screws 45 extends through the disc and is secured in one or another of four slip rings or slip ring segments 47, 48, 49, and 50, concentrically mounted on the left hand face of the disc. The disc may be of insulating material and thus insulate the screws 45 and the slip rings from each other, or these may be individually insulated from the disc if this be of metal.

Four brushes 51, 52, 53, and 54 are suitably mounted on and insulated from the yoke 20 to be stationary with respect to the disc 46 and to bear respectively on the contacts 47, 48, 49, and 50 in the position shown in Figs. 1 and 2. A common lead 55 is connected to both brushes 51 and 52 and another common lead 56 is connected to both brushes 53 and 54. The insulated leads 55 and 56 pass down the yoke and are connected respectively to slip rings 57 and 58 mounted on and insulated from the base of the yoke. Brushes 59 and 60 slide respectively on the rings 57 and 58 and are connected through a battery 61, or other source of current, to the winding of a relay or solenoid 62, which actuates a double switch 63 to close a signal circuit 64 and simultaneously open a circuit 65 to shut off power from the main drive (not shown).

In operation, the end of the cable 22 is laid on the drum of the reel 25, brought through a perforation in the left hand head of the reel and its four conductors fanned out. Each conductor end is inserted into one of the perforations 43 and clamped there. Thus each conductor is electrically connected through a screw 39, a plug 38, a conductor 44 and a screw 45 with one or other of the contacts 47, 48, 49, and 50 on the disc 46. The switch 63 is set in the position shown in full lines in Fig. 1, and the machine started together with the motor 31. Cable 22 is produced by the machine (not shown) and is wound on the take-up reel 25.

In the position shown in Fig. 2, let the conductor of the cable connected as above described to contact 47 be designated A, that connected to contact 48 as B, that to 49 as C, and that to 50 as D, and assume that lead 55 is electrically positive and lead 56 negative. Then in the position shown conductors A and B are positive and C and D are negative and there is a potential difference between the members of each of the pairs A—C, A—D, B—C, and B—D. When the disc 46 has made half a rotation, the polarities of the contacts 48 and 49 and hence of conductors B and C are interchanged so that now A and C are positive and B and D are negative and there is now a potential difference between the members of each of the pairs A—B, A—D, B—C, and C—D. There being six possible pairs selectable from four things, and six pairs appearing among the pairs thus subjected to a potential, namely A—B, A—C, A—D, B—C, B—D, and C—D, each possible pair of conductors is tested during at least half a revolution of the disc 46, or of the reel 25 which rotates with the disc.

If a short circuit appears between any two of the conductors therefore, it will, within one rotation of the reel, close the circuit through the leads 55 and 56 to energize the solenoid 62 which in turn will shift the switch 63 from the solid to the dotted position and thus close the circuit 64, 64 through the signal and simultaneously open the drive control circuit 65, 65 to stop the machine.

Figs. 5 and 6 disclose a similar embodiment in a different form as applied to the take-up reel of a machine for twisting only two conductors together. The reel 25 is removably mounted on spindles 26 and 27 and driven as before. A two part disc 70 of sheet metal has its parts yieldingly held together by springs 71, 71 and has a central circular aperture larger than the spindle 26. A ring 72 of insulating material is concentrically located on the outer face of the disc (Fig. 5) secured to one of the parts and slidable on the other. By pulling the two parts of the disc apart it may be snapped over the head of a reel and held thereon by its edges which are rolled over as at 73 for that purpose.

Slip rings 74 and 75 are mounted on or in the outer face of the ring 72 to contact with brushes 76 and 77 respectively stationarily mounted on an adjacent member of the machine. Brushes 76 and 77 are connected to leads 55 and 56 and to signal and control apparatus as before. Insulated conductors 78 and 79 are permanently connected to the slip rings 75 and 74 and are brought through the central aperture of the disc and through a perforation in the reel head and connected to the ends of the twisted pair of conductors being wound on the reel. There is only one pair of conductors in question in this case, and therefore a commutating means is not necessary as in the first apparatus described above, but in other respects the operation is substantially the same.

The invention is herein disclosed as applied to four conductors and to two conductor assemblies but may by using a suitable number and arrangement of contacts and connections be applied to the testing of any number of strands. The embodiments herein disclosed are illustrative merely and may be widely modified and departed from in many ways without departing from the scope and spirit of the invention as pointed out in and limited solely by the appended claims.

What is claimed is:

1. In apparatus for handling multi-conductor strands, rotatable strand holding means, commutator means having a plurality of stationary contacts and an equal plurality of contacts coacting therewith and rotatable with the strand holding means and connectible respectively with the several conductors of a multi-conductor strand on the strand holding means, and an electrical circuit connected to the commutator means to be rendered effective thereby upon the occurrence of a short circuit between any two of the conductors.

2. In apparatus for handling multi-conductor strands, rotatable strand holding means, a support rotatable therewith and having a plurality of concentrically disposed commutator contacts thereon, means to connect each conductor of a multi-conductor strand on the strand holding means to one of the contacts, two pluralities of stationary contacts to coact with the commutator contacts, means to apply an electric potential across the two pluralities of stationary contacts and including an electrical circuit to be rendered effective by a short circuit between any two of the conductors.

3. In an apparatus for testing strands, a rotatable reel for holding a plurality of conductor strands, a disc mounted to be rotatable with the reel, a plurality of concentric arcuate commutator contacts on the disc and rotatable therewith, means to connect each of a plurality of conductor strands on the reel to an individual respective contact on the disc, a plurality of stationary contacts for coaction with the rotatable contacts, means to connect a part of the plurality of stationary contacts to one side of an electrical circuit including a source of electric potential and to connect the rest of the plurality of stationary contacts to the other side of the said circuit whereby the said circuit will be closed by a short circuit between any two of the conductor strands.

4. In an apparatus for testing strands, a rotatable reel for holding a plurality of conductor strands, a disc mounted to be rotatable with the reel, a plurality of concentric arcuate commutator contacts on the disc and rotatable therewith, means to connect each of a plurality of conductor strands on the reel to an individual respective contact on the disc, a plurality of stationary contacts for coaction with the rotatable contacts, means to connect a part of the plurality of stationary contacts to one side of an electrical circuit including a source of electric potential and to connect the rest of the plurality of stationary contacts to the other side of the said circuit whereby the potential will be applied to each possible pair of the conductor strands during some part of each rotation of the reel and the said circuit will be closed by a short circuit between any two of the conductor strands.

VAUGHN L. JOHANNESSEN.